(12) United States Patent
Sakurai et al.

(10) Patent No.: US 7,550,947 B2
(45) Date of Patent: Jun. 23, 2009

(54) BATTERY STATE MONITORING CIRCUIT AND BATTERY DEVICE

(75) Inventors: Atsushi Sakurai, Chiba (JP); Kazuaki Sano, Chiba (JP); Toshiyuki Koike, Chiba (JP)

(73) Assignee: Seiko Instruments Inc., Chiba (JP)

( * ) Notice: Subject to any disclaimer, the term of this patent is extended or adjusted under 35 U.S.C. 154(b) by 224 days.

(21) Appl. No.: 11/635,266

(22) Filed: Dec. 7, 2006

(65) Prior Publication Data
US 2007/0145947 A1    Jun. 28, 2007

(30) Foreign Application Priority Data
Dec. 19, 2005    (JP)    ............................. 2005-364667

(51) Int. Cl.
*H01M 10/46*    (2006.01)

(52) U.S. Cl. ..................................... 320/134
(58) Field of Classification Search .................. 320/107, 320/112, 114, 132, 134, 136
See application file for complete search history.

(56) References Cited

U.S. PATENT DOCUMENTS

| | | | |
|---|---|---|---|
| 5,949,233 A * | 9/1999 | Mashiko | ...................... 324/433 |
| 2002/0109486 A1 | 8/2002 | Tange et al. | |

* cited by examiner

*Primary Examiner*—Edward Tso
(74) *Attorney, Agent, or Firm*—Brinks Hofer Gilson & Lione

(57) ABSTRACT

Provided are a battery state monitoring circuit in which charging of a secondary battery in an over-charge detection state is prevented to improve safety, and a battery device including the battery state monitoring circuit. A circuit for consuming a leakage current is provided in the battery state monitoring circuit to prevent the secondary battery from being charged with the leakage current.

8 Claims, 3 Drawing Sheets

BATTERY STATE MONITORING CIRCUIT AND BATTERY DEVICE

This application claims priority under 35 U.S.C. § 119 to Japanese Patent Application No. JP2005-364667 filed Dec. 19, 2005, the entire content of which is hereby incorporated by reference.

BACKGROUND OF THE INVENTION

1. Field of the Invention

The present invention relates to a chargeable battery device, and more particularly, to a battery state monitoring circuit for monitoring charging and discharging of a battery device.

2. Description of the Related Arts

FIG. 3 is a block diagram showing a conventional battery device. In the conventional battery device, a negative electrode of a secondary battery 301 is connected with a negative external terminal 313 with which one end of a charger 310 or one end of an external load 311 is to be connected. A positive electrode of the secondary battery 301 is connected with a positive external terminal 312 with which the other end of the charger 310 or the other end of the external load 311 is to be connected, through a switch circuit 302 and a switch circuit 303 which are connected in series. The secondary battery 301 is connected in parallel with a battery state monitoring circuit 316. The battery state monitoring circuit 316 includes a voltage detecting circuit 317 for detecting a voltage of the secondary battery 301 and an over-current detecting circuit 319 for detecting a voltage generated between an over-current detection terminal 309 and a VDD terminal 314.

The battery state monitoring circuit 316 has a function of turning OFF the switch circuit 303 when a state in which a battery voltage of the secondary battery 301 is higher than a predetermined voltage value is detected. This state is referred to as an "over-charge detection state". In addition, the battery state monitoring circuit 316 has a function of turning OFF the switch circuit 302 when a state in which the battery voltage of the secondary battery 301 is lower than a predetermined voltage value is detected. This state is referred to as an "over-discharge detection state". Further, the battery state monitoring circuit 316 has a function of turning OFF the switch circuit 302 when a state in which an inter-terminal voltage generated between the over-current detection terminal 309 and the VDD terminal 314 becomes larger than a predetermined voltage value by an increase in current flowing through the switch circuits 302 and 303, each of which has a predetermined ON resistance. This state is referred to as an "over-current detection state". In the over-current detection state, a PMOSFET 306 is being turned ON, so the over-current detection terminal 309 is pulled up to the VDD terminal 314 through a resistor circuit 307. The pull-up is used to release the over-current detection state. That is, when a resistance value of the external load 311 is sufficiently larger than that of the resistor circuit 307, a voltage at the over-current detection terminal 309 becomes close to a voltage at the VDD terminal 314. Then, the inter-terminal voltage generated between the over-current detection terminal 309 and the VDD terminal 314 becomes smaller than the predetermined voltage value. The over-current detecting circuit 319 detects the inter-terminal voltage and generates a release signal.

However, according to the conventional battery device, the switch circuit 303 is being turned OFF in the over-charge detection state. Therefore, the voltage at the over-current detection terminal 309 is increased to a value larger than the voltage at the VDD terminal 314 by the charger 310, so a leakage current 320 flows from the over-current detection terminal 309 to the VDD terminal 314 through the resistor circuit 307 and a parasitic capacitor 308. The leakage current 320 flows from the VDD terminal 314 into the secondary battery 301. Thus, there is a problem in that it is likely to continue charging even in the over-charge detection state.

In the conventional battery state monitoring circuit and the conventional battery device, the resistance value of the resistor circuit 307 is increased to limit the leakage current 320 to a small value. Therefore, even when the resistance value of the resistor circuit 307 is to be reduced in view of the release of the over-current detection state, there is a problem in that the reduction in resistance value cannot be realized because the leakage current 320 becomes larger.

SUMMARY OF THE INVENTION

Therefore, the present invention has been made to solve the above-mentioned conventional problems. An object of the present invention is to provide a battery state monitoring circuit in which charging in an over-charge detection state is prevented to improve safety, and a battery device including the battery state monitoring circuit.

In order to solve the above-mentioned problems, according to the battery state monitoring circuit and the battery device in the present invention, a circuit for consuming a leakage current is additionally provided in the battery state monitoring circuit to prevent the secondary battery from being charged with the leakage current.

According to the battery state monitoring circuit and the battery device in the present invention, the above-mentioned structure is employed. Therefore, there is an effect that the conventional problems can be solved to provide the battery state monitoring circuit in which charging in the over-charge detection state is prevented to improve safety and the battery device including the battery state monitoring circuit.

In addition, there is an effect that a pull-up resistance value used to release an over-current detection state can be freely set for any use.

DESCRIPTION OF THE PREFERRED EMBODIMENTS

First Embodiment

Figure 1:
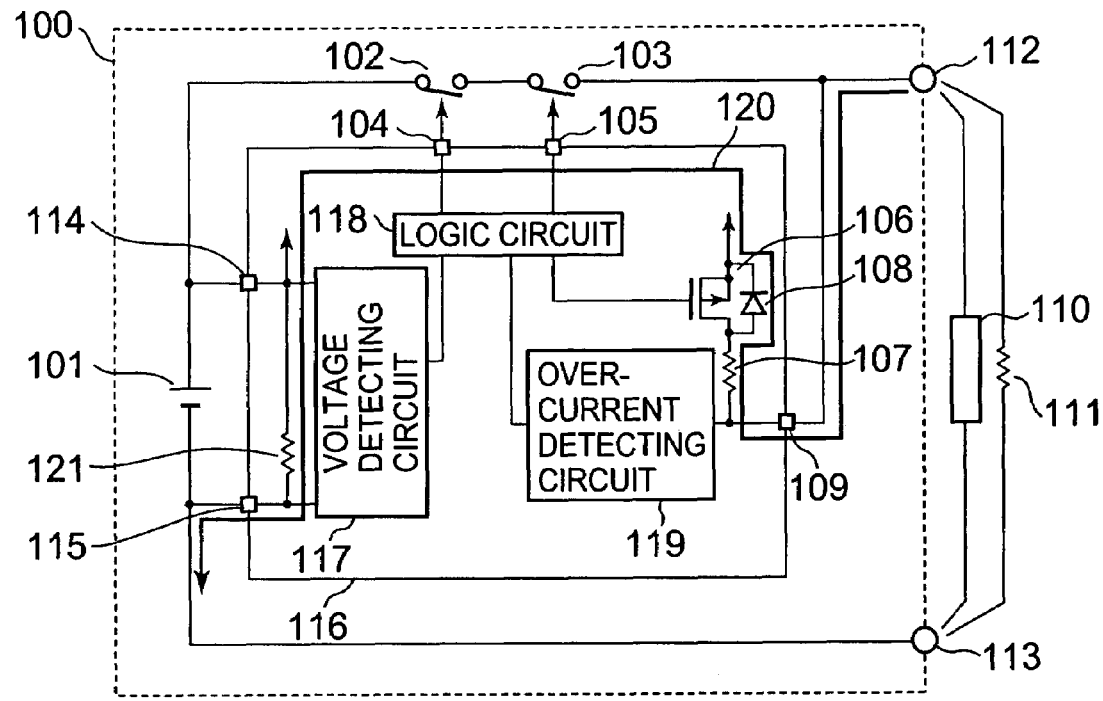
FIG. 1 is a circuit block diagram showing a battery state monitoring circuit and a battery device according to a first embodiment of the present invention.

FIG. 1 is a circuit block diagram showing a battery state monitoring circuit and a battery device according to a first embodiment of the present invention.

In a battery device 100 shown in FIG. 1, a negative electrode of a secondary battery 101, which is chargeable and dischargeable, is connected with a negative external terminal 113 that is to be connected to one end of a charger 110 or one end of an external load 111. A positive electrode of the secondary battery 101 is connected with a positive external terminal 112 that is to be connected to the other end of the charger 110 or the other end of the external load 111. The positive electrode of the secondary battery 101 is connected with the positive external terminal 112 through a switch circuit 102 and a switch circuit 103 that correspond to current limit means for adjusting a current of the secondary battery 101 and are connected in series. The secondary battery 101 is connected in parallel with a battery state monitoring circuit 116 capable of monitoring at least one of a voltage and a current of the secondary battery 101.

The charger 110 is connected with the battery device 100 to start charging. After that, when a voltage of the secondary battery 101 exceeds an upper limit voltage to which the secondary battery 101 can be charged, a detection signal is output from a voltage detecting circuit 117. The detection signal is input into a logic circuit 118. The logic circuit 118 performs predetermined signal processing such as processing for delaying the detection signal by a delay time to prevent a malfunction caused by a temporary noise, and then outputs the detection signal to a charge control terminal 104. The detection signal output from the charge control terminal 104 is used to turn off the switch circuit 103, thereby stopping the flow of charge current. Therefore, the battery device 100 becomes a charge protection state. This state is referred to as an over-charge detection state. In the over-charge detection state, the switch circuit 103 is turned OFF, so a voltage at an over-current detection terminal 109 is increased to a value larger than a voltage at a VDD terminal 114 by the charger 110. Then, a leakage current 120 flows from the over-current detection terminal 109 to the VDD terminal 114 through a resistor circuit 107 and a parasitic capacitor 108.

The external load 111 is connected with the battery device 100 to start discharging. After that, when the voltage of the secondary battery 101 is lower than a lower limit voltage to which the secondary battery 101 can be discharged, a detection signal is output from the voltage detecting circuit 117. The detection signal is input into the logic circuit 118. The logic circuit 118 performs predetermined signal processing such as processing for delaying the detection signal by a delay time to prevent a malfunction caused by a temporary noise, and then outputs the detection signal to a discharge control terminal 105. The detection signal output from the discharge control terminal 105 is used to turn off the switch circuit 102, thereby stopping the flow of discharge current. Therefore, the battery device 100 becomes a discharge protection state. This state is referred to as an over-discharge detection state.

The discharge current of the secondary battery 101 increases when a resistance value of the external load 111 reduces. After that, when a current of the secondary battery 101 exceeds an upper limit current to which the secondary battery 101 can be discharged, an inter-terminal voltage generated between the over-current detection terminal 109 and a VDD terminal 114 becomes larger than a predetermined voltage value by an increase in current flowing through the switch circuits 102 and 103, each of which has a predetermined ON resistance. An over-current detecting circuit 119 detects the inter-terminal voltage and generates a detection signal. The detection signal is inputted into the logic circuit 118. The logic circuit 118 performs predetermined signal processing such as processing for delaying the detection signal by a delay time to prevent a malfunction caused by a temporary noise, and then outputs the detection signal to the discharge control terminal 105. The detection signal outputted from the discharge control terminal 105 is used to turn off the switch circuit 102, thereby stopping the flow of discharge current. Therefore, the battery device 100 becomes the discharge protection state. This state is referred to as an over-current detection state. In the over-current detection state, a PMOSFET 106 is turned ON, so the over-current detection terminal 109 is pulled up to the VDD terminal 114 through the resistor circuit 107. The pull-up is used to release the over-current detection state. That is, when the resistance value of the external load 111 is sufficiently larger than that of the resistor circuit 107, the voltage at the over-current detection terminal 109 becomes close to the voltage at the VDD terminal 114. Then, the inter-terminal voltage generated between the over-current detection terminal 109 and the VDD terminal 114 becomes smaller than the predetermined voltage value. The over-current detecting circuit 119 detects the inter-terminal voltage and generates a release signal. The resistor circuit 107 has several kΩ to several hundred MΩ for any use. The leakage current 120 in the over-charge detection state is limited by the resistor circuit 107.

Here, in the battery state monitoring circuit 116 according to the present invention, a resistor circuit 121 which is a current consuming circuit for consuming a current flowing from the charger is connected between the VDD terminal 114 and a VSS terminal 115. The leakage current 120 flows into the VSS terminal 115 through the resistor circuit 121. Therefore, in the over-charge detection state, the secondary battery 101 is not charged with the leakage current 120, with the result that the safety of the battery device 100 can be improved without an unnecessary increase in voltage of the secondary battery 101. It is only necessary to set a value of the resistor circuit 121 such that the entire leakage current 120 flows into the VSS terminal 115. Therefore, for example, the resistance value of the resistor circuit 107 used to release the over-current detection state is not limited to a large value necessary to reduce the leakage current 120. Thus, the resistance value can be freely set for any use.

Second Embodiment

Figure 2:
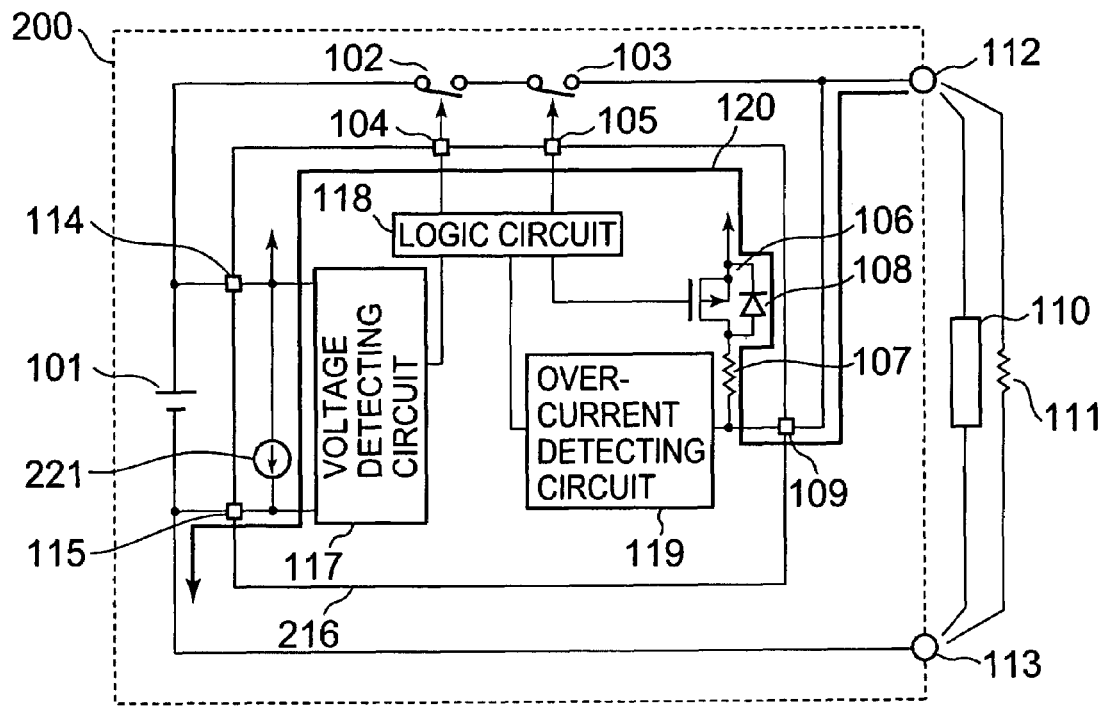
FIG. 2 is a circuit block diagram showing a battery state monitoring circuit and a battery device according to a second embodiment of the present invention.
Figure 3:
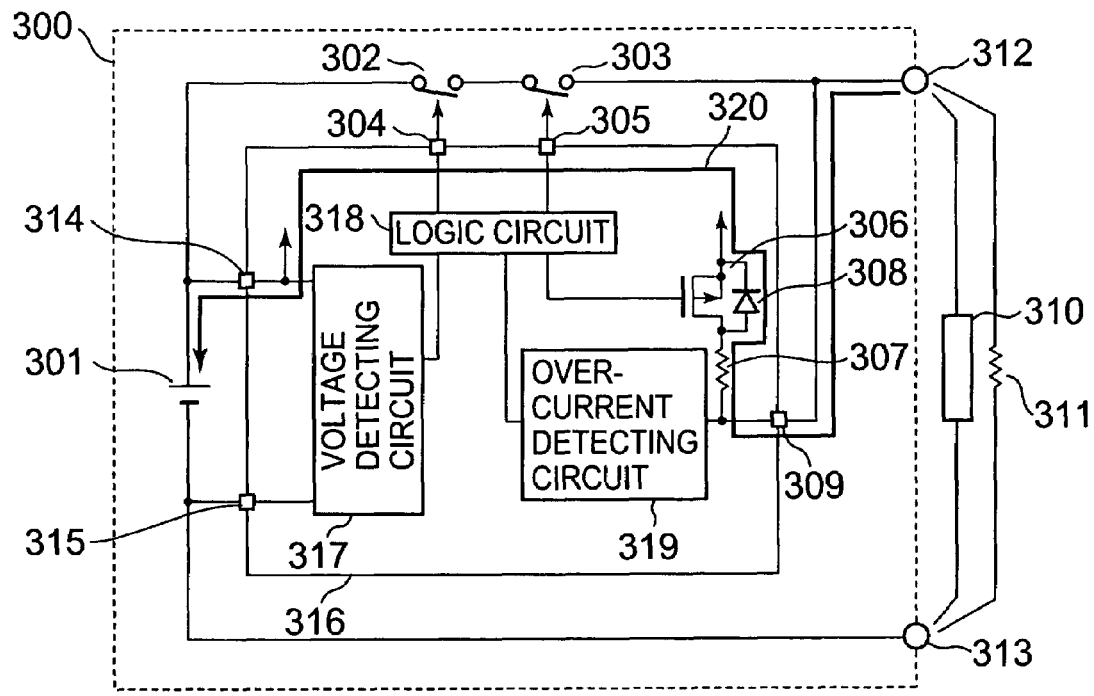
FIG. 3 is a circuit block diagram showing a conventional battery state monitoring circuit and a conventional battery device.

FIG. 2 is a circuit block diagram showing a battery state monitoring circuit and a battery device according to a second embodiment of the present invention.

In a battery device 200 shown in FIG. 2, the secondary battery 101 is connected in parallel with a battery state monitoring circuit 216 capable of monitoring at least one of the voltage and the current of the secondary battery 101. The battery state monitoring circuit 216 includes a constant current circuit 221 connected between the VDD terminal 114 and the VSS terminal 115. Another structure and operation are identical to those in the battery device 100 and the battery state monitoring circuit 116.

Here, in the battery state monitoring circuit 216 according to the present invention, the constant current circuit 221 which is the current consuming circuit for consuming the current flowing from the charger is connected between the VDD terminal 114 and the VSS terminal 115. The leakage current 120 flows into the VSS terminal 115 through the constant current circuit 221. Therefore, in the over-charge detection state, the secondary battery 101 is not charged with the leakage current 120, with the result that the safety of the battery device 200 can be improved without an unnecessary increase in voltage of the secondary battery 101. It is only necessary to set a value of the constant current circuit 221 such that the entire leakage current 120 flows into the VSS terminal 115. Therefore, for example, the resistance value of the resistor circuit 107 used to release the over-current detection state is not limited to a large value necessary to reduce the leakage current 120. Thus, the resistance value can be freely set for any use.

Third Embodiment

Figure 4:
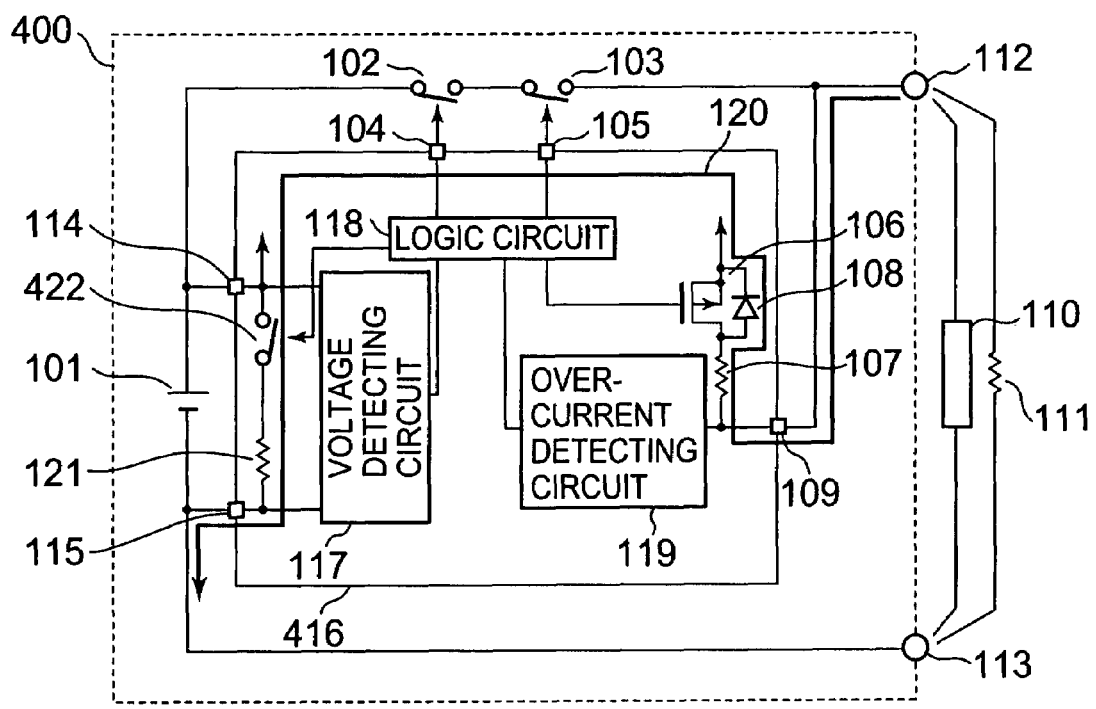
FIG. 4 is a circuit block diagram showing a battery state monitoring circuit and a battery device according to a third embodiment of the present invention.

FIG. 4 is a circuit block diagram showing a battery state monitoring circuit and a battery device according to a third embodiment of the present invention.

In a battery device 400 shown in FIG. 4, the secondary battery 101 is connected in parallel with a battery state monitoring circuit 416 capable of monitoring at least one of the voltage and the current of the secondary battery 101. The battery state monitoring circuit 416 includes the resistor circuit 121 and a switch circuit 422 which are connected between the VDD terminal 114 and the VSS terminal 115. Another structure and operation are identical to those in the battery device 100 and the battery state monitoring circuit 116.

Here, in the battery state monitoring circuit 416 according to the present invention, the resistor circuit 121 and the switch circuit 422 which compose the current consuming circuit for consuming the current flowing from the charger are connected between the VDD terminal 114 and the VSS terminal 115. In the over-charge detection state, the switch circuit 422 is being turned ON, so the leakage current 120 flows into the VSS terminal 115 through the resistor circuit 121 and the switch circuit 422. Therefore, in the over-charge detection state, the secondary battery 101 is not charged with the leakage current 120, with the result that the safety of the battery device 400 can be improved without an unnecessary increase in voltage of the secondary battery 101. It is only necessary to set the value of the resistor circuit 121 such that the entire leakage current 120 flows into the VSS terminal 115. Therefore, for example, the resistance value of the resistor circuit 107 used to release the over-current detection state is not limited to a large value necessary to reduce the leakage current 120. Thus, the resistance value can be freely set for any use. The switch circuit 422 is being turned ON during the over-charge detection state in which a detection signal for charge protection is generated, so a consumed current of the battery state monitoring circuit 416 in a state other than the over-charge detection state can be reduced.

Fourth Embodiment

Figure 5:
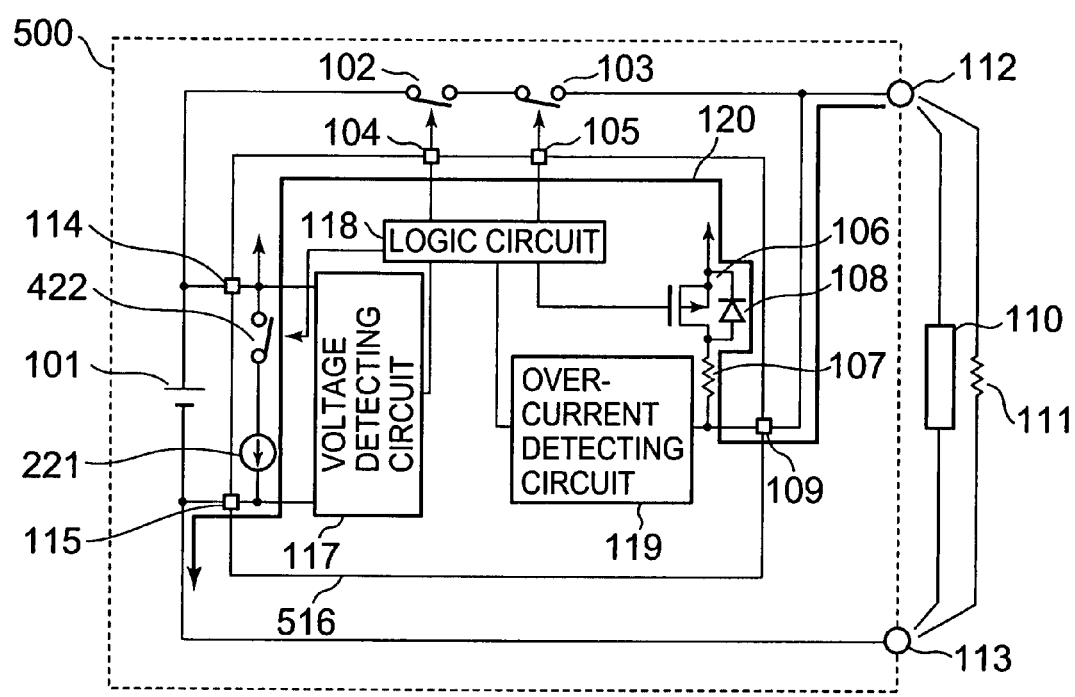
FIG. 5 is a circuit block diagram showing a battery state monitoring circuit and a battery device according to a fourth embodiment of the present invention.

FIG. 5 is a circuit block diagram showing a battery state monitoring circuit and a battery device according to a fourth embodiment of the present invention.

In a battery device 500 shown in FIG. 5, the secondary battery 101 is connected in parallel with a battery state monitoring circuit 516 capable of monitoring at least one of the voltage and the current of the secondary battery 101. The battery state monitoring circuit 516 includes the constant current circuit 221 and the switch circuit 422 which are connected between the VDD terminal 114 and the VSS terminal 115. Another structure and operation are identical to those in the battery device 100 and the battery state monitoring circuit 116.

Here, in the battery state monitoring circuit 516 according to the present invention, the constant current circuit 221 and the switch circuit 422 which compose the current consuming circuit for consuming the current flowing from the charger are connected between the VDD terminal 114 and the VSS terminal 115. In the over-charge detection state, the switch circuit 422 is being turned ON, so the leakage current 120 flows into the VSS terminal 115 through the constant current circuit 221 and the switch circuit 422. Therefore, in the over-charge detection state, the secondary battery 101 is not charged with the leakage current 120, with the result that the safety of the battery device 500 can be improved without an unnecessary increase in voltage of the secondary battery 101. It is only necessary to set the value of the constant current circuit 221 such that the entire leakage current 120 flows into the VSS terminal 115. Therefore, for example, the resistance value of the resistor circuit 107 used to release the over-current detection state is not limited to a large value necessary to reduce the leakage current 120. Thus, the resistance value can be freely set for any use. The switch circuit 422 is being turned ON during the over-charge detection state in which the detection signal for charge protection is generated, so a consumed current of the battery state monitoring circuit 516 in a state other than the over-charge detection state can be reduced.

What is claimed is:

1. A battery state monitoring circuit for monitoring a voltage between both ends of a secondary battery to control charging and discharging of the secondary battery, comprising:
   terminals connected with the both ends of the second battery; and
   a current consuming circuit provided between the terminals, for consuming a current,
   wherein, in an over-charge detection state for protecting the charging of the secondary battery, the current consuming circuit consumes a leakage current flowing from a charger to prevent the leakage current from flowing into the second battery.

2. A battery state monitoring circuit according to claim 1, wherein:
   the current consuming circuit comprises a first switch circuit; and
   at the same time that the first switch circuit comes into the over-charge detection state, the first switch circuit is controlled to cause the current consuming circuit to consume the current.

3. A battery state monitoring circuit according to claim 1, wherein the current consuming circuit comprises a resistor circuit.

4. A battery state monitoring circuit according to claim 1, wherein the current consuming circuit comprises a constant current circuit.

5. A battery device, comprising:
   external terminals connected with one of a charger and a load;
   a secondary battery and a first switch circuit which are connected in series between the external terminals; and
   a battery state monitoring circuit for monitoring a voltage between both ends of the secondary battery to control the first switch circuit,
   wherein the battery state monitoring circuit includes a current consuming circuit provided between terminals connected with the both ends of the secondary battery, for consuming a current, and
   in an over-charge detection state for protecting charging of the secondary battery, the current consuming circuit consumes a leakage current flowing from a charger to prevent the leakage current from flowing into the second battery.

6. A battery device according to claim 5, wherein:
   the current consuming circuit comprises a second switch circuit; and at the same time that the first switch circuit is turned off, the second switch circuit is turned on to cause the current consuming circuit to consume the current.

7. A battery device according to claim 5, wherein the current consuming circuit comprises a resistor circuit.

8. A battery device according to claim 5, wherein the current consuming circuit comprises a constant current circuit.

* * * * *